United States Patent
Johnson et al.

(10) Patent No.: US 11,016,231 B2
(45) Date of Patent: May 25, 2021

(54) RETARDER

(71) Applicant: 3M INNOVATIVE PROPERTIES COMPANY, St. Paul, MN (US)

(72) Inventors: Stephen A. Johnson, Woodbury, MN (US); Derek W. Patzman, Savage, MN (US); Richard Y. Liu, Woodbury, MN (US); Victor Ho, St. Paul, MN (US); John F. Van Derlofske, III, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/765,400

(22) PCT Filed: Nov. 19, 2018

(86) PCT No.: PCT/US2018/061738
§ 371 (c)(1),
(2) Date: May 19, 2020

(87) PCT Pub. No.: WO2019/108425
PCT Pub. Date: Jun. 6, 2019

(65) Prior Publication Data
US 2020/0333521 A1 Oct. 22, 2020

Related U.S. Application Data

(60) Provisional application No. 62/592,545, filed on Nov. 30, 2017.

(51) Int. Cl.
*G02B 5/30* (2006.01)
*C08L 67/02* (2006.01)

(52) U.S. Cl.
CPC ............ *G02B 5/3016* (2013.01); *C08L 67/02* (2013.01); *C08L 2203/20* (2013.01); *C08L 2205/025* (2013.01)

(58) Field of Classification Search
USPC ......................................................... 349/194
See application file for complete search history.

(56) References Cited

U.S. PATENT DOCUMENTS

| 6,580,674 B1 | 6/2003 | Nishiyama et al. |
| 2009/0273836 A1* | 11/2009 | Yust ........................ B32B 27/36 359/489.04 |
| 2010/0101824 A1 | 4/2010 | Fujumoto |
| 2011/0268939 A1 | 11/2011 | Liu et al. |
| 2012/0099052 A1 | 4/2012 | Lazarev |

FOREIGN PATENT DOCUMENTS

KR 10-2014-0139666 12/2014

OTHER PUBLICATIONS

ISR PCT/US2018/061738, dated Apr. 29, 2019, 4 pages.
Written Opinion, PCT/US2018/061738, dated Apr. 29, 2019, 4 pages.

\* cited by examiner

*Primary Examiner* — Terressa Boykin
(74) *Attorney, Agent, or Firm* — Clifton F. Richardson

(57) ABSTRACT

A retarder including first and second outer layers and a birefringent layer disposed between and in direct contact with the first and second outer layers is described. The birefringent layer may include a first polyester having greater than 45 mole percent naphthalate units and greater than 45 mole percent ethylene units. Each of the first and second outer layers includes a second polyester which may include 40 to 50 mole percent naphthalate units, at least 25 mole percent ethylene units, and 10 to 25 mole percent of branched or cyclic C4-C10 alkyl units. The retarder has a retardance in a range of 1 micrometer to 100 micrometers.

15 Claims, 2 Drawing Sheets

RETARDER

BACKGROUND

Retarders are used in various applications to change a polarization of light. Retarders may be made from birefringent materials such as liquid crystal materials, quartz or mica.

SUMMARY

In some aspects of the present description, a retarder including first and second outer layers and a birefringent layer disposed between and in direct contact with the first and second outer layers is provided. The birefringent layer comprises a first polyester having greater than 45 mole percent naphthalate units and greater than 45 mole percent ethylene units. Each of the first and second outer layers comprises a second polyester, the second polyester comprising 40 to 50 mole percent naphthalate units, at least 25 mole percent ethylene units, and 10 to 25 mole percent of branched or cyclic C4-C10 alkyl units. The retarder has a first retardance in a range of 1 micrometer to 100 micrometers.

In some aspects of the present description, a retarder including first and second outer layers and a birefringent layer disposed between and in direct contact with the first and second outer layers is provided. The birefringent layer comprises a first polyester comprising a plurality of first monomer units. Each of the first and second outer layers comprises a second polyester, the second polyester being a copolyester comprising a plurality of the first monomer units and a plurality of second monomer units. The second monomer units hinder crystallization of the second polyester. The retarder has a first retardance in a range of 1 micrometer to 100 micrometers.

In some aspects of the present description, a retarder including first and second outer layers and a birefringent layer disposed between and in direct contact with the first and second outer layers is provided. Each of the first and second outer layers has an in-plane birefringence less than 0.02 and an out-of-plane birefringence less than 0.02. The birefringent layer comprises a first polyester comprising a plurality of first monomer units. Each of the first and second outer layers comprises a second polyester, the second polyester being a copolyester comprising a plurality of the first monomer units. The retarder has a first retardance in a range of 1 micrometer to 100 micrometers.

DETAILED DESCRIPTION

Figure 1:
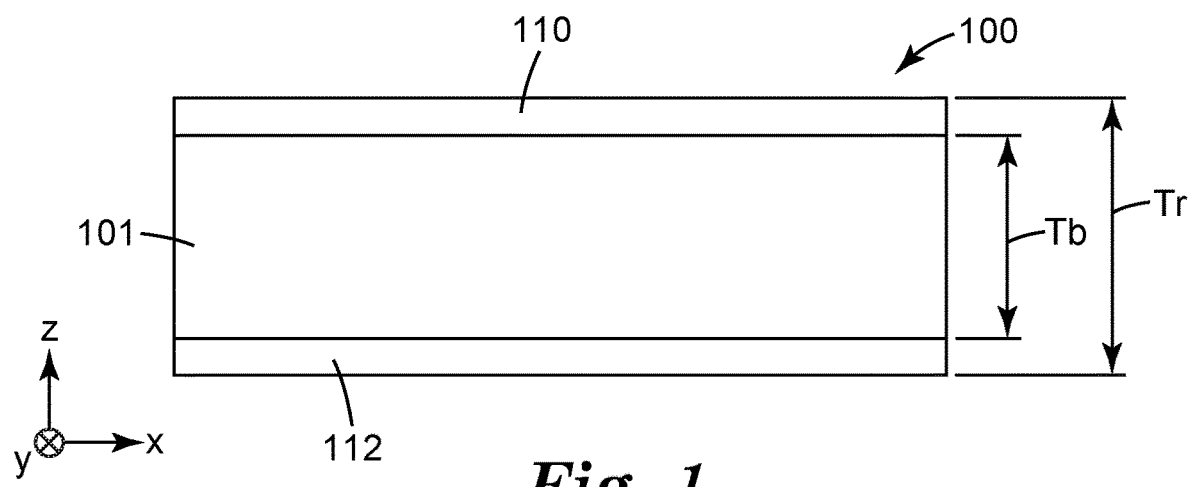
FIG. 1 is a schematic cross-sectional view of a retarder.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Retarders are used in various applications to change a polarization of light. For example, a quarter-wave retarder with a fast axis oriented at 45 degrees relative to a polarization plane can be used to change linearly polarized light into circularly polarized light. Retarders may be made from birefringent materials such as liquid crystal materials, quartz or mica. According to some embodiments of the present description, film retarders have been developed which are easily processed via extrusion, orientation and conventional web handling techniques, and which are suitable for use in display applications and in other applications. It has been found that some polyesters can be used to provide a film retarder, but that the mechanical properties of a single isolated layer of the polyester is not acceptable for many applications. In some cases, it is desired for a retarder to have a high retardance (e.g., at least 1 micrometer) and it has been found to be difficult to provide a monolithic single layer retarder film having a suitably high retardance without sacrificing needed mechanical properties. For example, polyethylene naphthalate (PEN) can be used as a retarder film, but a monolithic single layer of PEN having a retardance of at least 1 micrometer can be too brittle for many applications. However, according to some aspects of the present description, it has been found than PEN or other polyesters may be used as a retarder layer in a tri-layer stack including coPEN or other copolyesters in outer layers that are in direct contact with the PEN or other polyester layer where the tri-layer stack is mechanically robust (e.g., substantially less brittle than a monolithic uniaxially oriented PEN layer of the same thickness) and where the retarder has a high retardance. In some embodiments, the retarders of the present description have a controlled degree of uniform birefringence which gives substantially no visible stress birefringence when observed under crossed polarizers.

In some embodiments, the retarders are made by coextrusion followed by stretching and optional heat setting. The stretching is typically uniaxial or substantially uniaxial and can be constrained (e.g., using a linear tenter) or unconstrained (e.g., using a parabolic tenter). It has been unexpectedly found that the isotropy of the outer layers of the retarder can be improved by heat setting and that this improved isotropy provides improved durability (e.g., toughness) of the retarder. The heat setting may take place above a melting point of the copolyester of the outer layers. In some embodiments, a heat set temperature in a range of 200° C. to 240° C. or 210° C. to 230° C. is used. In some embodiments, the heat set temperature is about 220° C.

FIG. 1 is a schematic cross-sectional view of retarder 100 including first and second outer layers 110 and 112 and a birefringent layer 101 disposed between and in direct contact with the first and second outer layers 110 and 112. In some embodiments, the birefringent layer 101 includes a first polyester including a plurality of first monomer units. In some embodiments, the first monomer units are naphthalate units and the first polyester further includes ethylene units. For example, in some embodiments, the first polyester includes greater than 45 mole percent naphthalate units and greater than 45 mole percent ethylene units. In some embodiments, the first polyester includes greater than 47 mole percent, or greater than 48 mole percent, or greater than 49 mole percent naphthalate units and greater than 47 mole percent, or greater than 48 mole percent, or greater than 49 mole percent ethylene units. For example, the first polyester may be polyethylene naphthalate (PEN), which may also be referred to as poly(ethylene-2,6-naphthalate) and which includes 50 mole percent naphthalate units and 50 mole percent ethylene units. Such polyesters can be made via a condensation reaction between naphthalenedicarboxylic acid and ethylene glycol. More generally, one or more diacids and one or more diols may be used to generate the first polyester. As an illustrative example, the first polyester may be a reaction product of 46 mole percent naphthalenedicarboxylic acid, 4 mole percent terephthalic acid, 49 mole percent ethylene glycol and 1 mole percent 1,4-butanediol. In some embodiments, diesters instead of diacids are used in forming the first polyester.

In some embodiments, each of the first and second outer layers 110 and 112 includes a second polyester, where the second polyester is a copolyester including a plurality of the first monomer units and a plurality of second monomer units. In some embodiments, the first monomer units are naphthalate units and the second monomer units are branched or cyclic C4-C10 alkyl units which may be included to hinder crystallization of the second polyester. For example, in some embodiments, the second polyester includes 40 to 50 mole percent naphthalate units, at least 25 mole percent ethylene units, and 10 to 25 mole percent of branched or cyclic C4-C10 alkyl units. The second polyester may include additional units, such as terephthalate units, for example. In some embodiments, the second polyester is a reaction product of a composition including 40 to 50 mole percent 2,6-naphthalenedicarboxylic acid or a diester of naphthalenedicarboxylic acid (e.g., dimethyl-2,6-naphthalenedicarboxylate); at least 25 mole percent ethylene glycol; and 10 to 25 mole percent of branched or cyclic C4-C10 alkyl diols, and/or up to 10 mole percent of branched or cyclic C4-C10 alkyl diacids, and/or up to 10 mole percent of branched or cyclic C4-C10 alkyl diesters. Except where indicated differently or the context clearly indicates differently, the mole percents of the diacids or diesters and the diols add to 100 mole percent. Additional components (e.g., catalysts) that do not form part of the resulting polyester are not included in these mole percents. Catalysts such as sodium acetate and/or tetrabutyl titanate can also be included in the composition. In some embodiments, the composition further includes additional diols, diacids or diesters. For example, up to 10% of dimethyl sodium-sulfoisophthalate is included in some embodiments. In some embodiments, the second polyester includes 40 to 50 mole percent, or 45 to 50 mole percent naphthalate units; 25 to 50 mole percent, or 25 to 40 mole percent ethylene units; and 10 to 25 mole percent of branched or cyclic C4-C10 alkyl units.

In some embodiments, the second polyester includes 50 mole percent naphthalate units, 25 to 40 mole percent ethylene units, and 10 to 25 mole percent of branched or cyclic C4-C10 alkyl units, where the mole percent of ethylene units and the mole percent of branched or cyclic C4-C10 alkyl units add to 50 mole percent. In some embodiments, the mole percent of ethylene units and the mole percent of branched or cyclic C4-C10 alkyl units add to less than 50 mole percent and additional units formed from one or more other glycols monomer molecules are included. Suitable glycol monomer molecules include propylene glycol; 1,4-butanediol and isomers thereof; 1,6-hexanediol; polyethylene glycol; diethylene glycol; tricyclodecanediol; and isomers thereof, norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene, for example. Typically, the amount of monomer units derived from other glycol monomer molecules (i.e., different than ethylene glycol and C4-C10 alkyl glycol(s) such as neopentyl glycol or cyclohexane glycol) is no greater than 5 mole percent. In some embodiments, units derived from other glycol monomer molecules is no greater than 1 or 2 mole percent. In the absence of other glycol monomer molecules in the synthesis, copolyester polymers may, in some cases, contain about 0.5 to 3 mol % of diethylene glycol as a side reaction by-product.

In some embodiments, the second polyester includes less than 50 mole percent naphthalate units. In some embodiments, the second polyester is formed from 2,6-naphthalene dicarboxylic acid or isomers thereof in combination with one or more other (i.e., different than naphthalene dicarboxylic acid monomer and isomers thereof) carboxylate monomer molecules. For embodiments where the second polyester contains more than one type of carboxylate unit, the second polyester may be a block or random copolyester. The total amount of other carboxylate monomer molecules may range up to 10 mole percent of the copolyester. Typically, the total amount of other carboxylate monomer molecules is no greater than 8, 6, 4, 3 or 2 mole percent of the copolyester. Suitable other carboxylate monomer molecules include, for example, terephthalic acid; isophthalic acid; phthalic acid; azelaic acid; adipic acid; sebacic acid; norbornene dicarboxylic acid; bi-cyclooctane dicarboxylic acid; t-butyl isophthalic acid, tri-mellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to C1-C10, preferably C1-C4, and more preferably C1-C2 straight-chained or branched alkyl groups.

Suitable branched or cyclic C4-C10 alkyl diols include, for example, cyclohexanedimethanol, neopentyl glycol, and mixtures thereof. The corresponding branched or cyclic C4-C10 alkyl diacid or branched or cyclic C4-C10 alkyl diester may be used in place of or in addition to the branched or cyclic C4-C10 alkyl diols. For example, dimethyl 1,4-cyclohexanedicarboxylate or 1,4-cyclohexanedicarboxylic acid may be used in place of, or in place of a portion of cyclohexanedimethanol. In some embodiments, branched or cyclic C4-C10 alkyl diols are used so that the second polyester can include 50 mole percent or close to 50 mole percent naphthalate units.

It is often preferred that the composition of the second polyester of the first outer layer 110 be the same as that of the second polyester of the second outer layer 112. However, in some embodiments, the composition of the second polyester of the first outer layer 110 and the second polyester of the second outer layer 112 may differ while remaining in a similar composition range. For example, the second polyester of the first outer layer 110 and the second polyester of the second outer layer 112 may be different but may both include 40 to 50 mole percent naphthalate units, at least 25 mole percent ethylene units, and 10 to 25 mole percent of branched or cyclic C4-C10 alkyl units. In some embodiments, the second polyester of the first outer layer 110 and the second polyester of the second outer layer 112 have nominally the same composition but the compositions may differ due to ordinary manufacturing variations, for example.

In some embodiments, the second polyester includes second monomer units which hinder crystallization of the second polyester. Suitable second monomer units for this purpose include branched or cyclic C4-C10 alkyl units as described further elsewhere herein. Using second monomer units which hinder crystallization can provide first and second outer layers 110 and 112 which are amorphous or substantially amorphous and/or which are isotropic or substantially isotropic. The degree of isotropy can be characterized by the birefringence of the outer layers. The in-plane birefringence refers to nx-ny where nx and ny are the refractive indices for light having an electric field along the x- and y-axes, respectively, referring to the x-y-z coordinate system of FIG. 1 and where x- is the in-plane direction having the largest refractive index. The in-plane birefringence is therefore greater than or equal to zero. The refractive index is determined at a wavelength of 633 nm unless specified differently. The refractive index can be determined according to the test standard ASTM D542-14 "Standard Test Method for Index of Refraction of Transparent Organic Plastics". The out-of-plane birefringence refers to ½(nx+ny)–nz where nz is the refractive indices for light having an electric field along the z-axis. The out-of-plane birefringence is typically greater than or equal to zero. The in-plane retardance of a layer is the thickness of the layer times the in-plane birefringence of the layer, and the out-of-plane retardance of a layer is the thickness of the layer times the out-of-plane birefringence. In some embodiments, each of the first and second outer layers has an in-plane birefringence less than 0.02 and an out-of-plane birefringence less than 0.02. In some embodiments, each of the first and second outer layers has an in-plane birefringence less than 0.01 and an out-of-plane birefringence less than 0.01. In some embodiments, the retarder is a curved and/or flexible film used in a curved and/or flexible display. If the retarder is curved, the in-plane and out-of-plane birefringence refers to the birefringence components determined relative to a plane tangent to the curve of the retarder.

The melting point of the first and/or second polyesters may be determined from differential scanning calorimetry (DSC). In some embodiments, the second polyester has a melt transition temperature less than 220° C., or less than 210° C., or less than 200° C. after induced crystallization. The crystallization can be induced by heating or stretching. In some embodiments, the melt transition temperature is determined by differential scanning calorimetry and the crystallization is induced by heating during the differential scanning calorimetry measurement. In some embodiments, the second polyester has no melting point detectable by differential scanning calorimetry. This is the case if there is no peak in the DSC curve associated with an annealing induced crystalline phase and there is no peak associated with the melting of an induced crystalline phase. In some embodiments, the melt transition temperature, if present, is greater than 150° C.

The enthalpy of fusion can be determined using differential scanning calorimetry as described in the test standard ASTM E793-06(2012) "Standard Test Method for Enthalpies of Fusion and Crystallization by Differential Scanning calorimetry". In some embodiments, the second polyester has an enthalpy of fusion of less than 10 J/g, or less than 5 J/g, or less than 3 J/g, or less than 1 J/g. The second polyester may be described as substantially amorphous if the second polyester has no melting point detectable by differential scanning calorimetry, or has a melt transition temperature less than 220° C. after induced crystallization, or has an enthalpy of fusion of less than 10 J/g.

In some embodiments, the first polyester has a glass transition temperature of at least 100° C. In some embodiments, the second polyester has a glass transition temperature of at least 90° C. or at least 100° C. In some embodiments, each of the first and second polyesters has a glass transition temperature of at least 90° C. or at least 100° C. In some embodiments, one or both of the first and second polyesters have a glass transition temperature of less than 160° C. The glass transition temperature can be determined by differential scanning calorimetry as described in the test standard ASTM E1356-08(2014) "Standard Test Method for Assignment of the Glass Transition Temperatures by Differential Scanning Calorimetry".

The polyesters described herein may be used in other applications such as in display substrates as described in U.S. Prov. Pat. Appl. No. 62/592,555, titled "Substrate Including a Self-Supporting Tri-Layer Stack", filed on Nov. 30, 2017, and incorporated herein by reference to the extent that it does not contradict the present description.

In some embodiments, the retarder 100 has a first retardance in the range of 1 micrometer, or 2 micrometers, or 5 micrometers, or 8 micrometers, or 10 micrometers to 200 micrometers, or to 100 micrometers, or to 50 micrometers, or to 25 micrometers. In some embodiments, the first retardance of the retarder 100 is substantially equal to a first retardance of the birefringent layer 101 since the retardance of the outer layers 110 and 112 may be negligible. The first retardance may refer to the in-plane retardance or to the out-of-plane retardance. In some embodiments, both the in-plane retardance and the out-of-plane retardance of the retarder 100 are in one of these ranges (e.g., a range of 1 micrometer to 100 micrometers). In some embodiments, the retarder 100 has a retardance sufficiently high that the retarder 100 can be used to effectively depolarize incident light. This can occur when the retardance is substantially larger than the wavelength of incident light since light with small differences in incident angle, for example, can then be retarded by significantly different amounts (e.g., significantly different fractions of the wavelength).

In some embodiments, the birefringent layer 101 has an in-plane birefringence of at least 0.15, or at least 0.2. In some embodiments, the birefringent layer 101 has an out-of-plane birefringence of at least 0.18, or at least 0.2. In comparison, uniaxially oriented polyethylene terephthalate (PET) has an in-plane birefringence of about 0.12 and an out-of-plane birefringence of about 0.16.

In some embodiments, the retarder 100 has a thickness Tr in a range of 20 micrometers, or 25 micrometers, to 200 micrometers or 125 micrometers. In some embodiments, the thickness Tb of the birefringent layer 101 is at least 80 percent, or at least 90 percent of the thickness Tr of the retarder 100. In some embodiments, the thickness Tb of the birefringent layer 101 is no more than 99 percent of the thickness Tr of the retarder 100. Using thicknesses and thickness ratios in these ranges have been found to provide desired mechanical properties and a desired retardance per unit overall thickness Tr of the retarder 100.

It has been found that using a common first monomer unit (e.g., naphthalate units) for the first and second polyesters can result in better delamination performance (separation of an outer layer 110 and/or 112) from the birefringent layer 101) compared to using first and second polyesters that do not share a common first monomer unit. Without intending to be limited by theory, it is believed that this occurs in the absence of chemical bonds between the outer layers 110, 112 and the birefringent layer 101 due to the similarity in the coefficient of thermal expansion of the layers.

In some embodiments, an additional coating or layer is applied to an outer surface of one or both of the outer layers 110 and 112. In some embodiments, an outer surface of one or both of the outer layers 110 and 112 is optically smooth. That is, any surface roughness present may have a peak to valley height small compared to a wavelength of visible light (e.g., small compared to 550 nm). In some embodiments, an outer surface has a surface roughness Ra of less than 100 nm, or less than 50 nm, or less than 20 nm, or even less than 10 nm. Ra refers to an arithmetic average of absolute values of differences between a surface height and an average surface position. Ra may be determined according to the American Society of Mechanical Engineers (ASME) B46.1-2009 test standard.

It may be desired for the retarder 100 to have a low haze so that the retarder does not degrade an image quality when used in a display, for example. In some embodiments, the retarder 100 has a haze of less than 2 percent, or less than 1 percent. Such low hazes can be obtained using the polyester compositions described elsewhere herein. Haze can be determined according to the test standard ASTM D1003-13 "Standard Test Method for Haze and Luminous Transmittance of Transparent Plastics".

It may be desired for the retarder to block ultraviolet radiation in order to protect other layers included in a display, for example. Utilizing naphthalate monomer units in the first polyester (e.g., utilizing PEN) can provide a desired degree of absorption in the ultraviolet. Whether naphthalate monomer units or other monomer units are utilized, it may be desired to include one or more ultraviolet absorbers in one or both of the first and second polyesters to increase the ultraviolet absorption of the retarder 100. Suitable ultraviolet absorbers include triazines, benzotriazoles, and benzophenones, for example.

Figure 2:
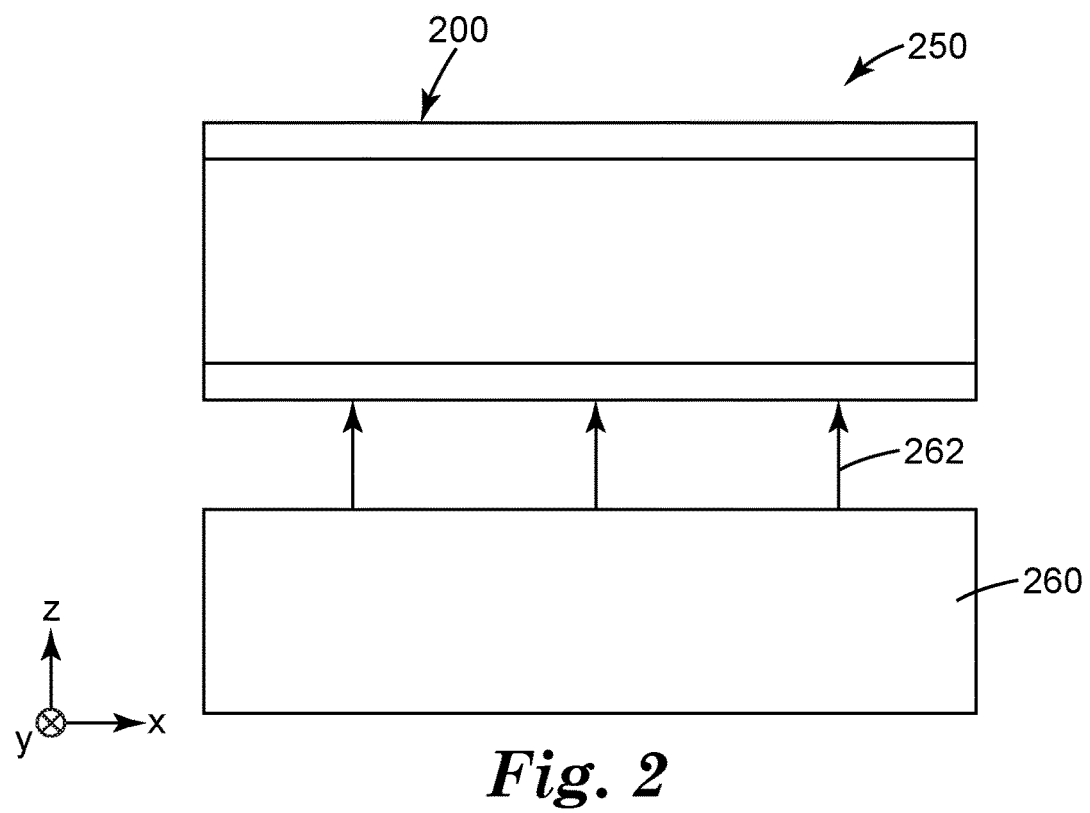
FIG. 2 is a schematic illustration of a display including an emissive component and a retarder.

FIG. 2 is a schematic illustration of a display 250 including an emissive component 260 and a retarder 200. The retarder 200 may be any retarder described elsewhere herein. For example, retarder 200 may correspond to retarder 100. Emissive component 260 may be a display panel such as a liquid crystal display (LCD) panel or an organic light emitting diode (OLED) display panel. Light is emitted by the emissive component in the z-direction referring to the x-y-z coordinate system of FIG. 2. The retarder 200 is disposed to receive a light output 262 of the emissive component 260. In some embodiments, the retarder 200 is separated from the emissive component 260 and in some embodiments, the retarder 200 is attached directly or indirectly (e.g., through one or more additional layers) to the emissive component 260 (e.g., via an optically clear adhesive). In some embodiments, the emissive component 260 produces a linearly polarized light output. In some embodiments, the retarder 200 has a fast axis disposed at an oblique angle to a polarization direction of the linearly polarized light output. In some embodiments, the oblique angle is in a range of 40 to 50 degrees. In some embodiments, the oblique angle is about 45 degrees. In some embodiments, the retarder 200 substantially depolarizes the light output 262 from the emissive component 260. In some embodiments, the display 250 may include additional layers or components not illustrated in FIG. 2. For example, a touch sensor may be disposed proximate the retarder 200 opposite the emissive component 260.

Figure 3:
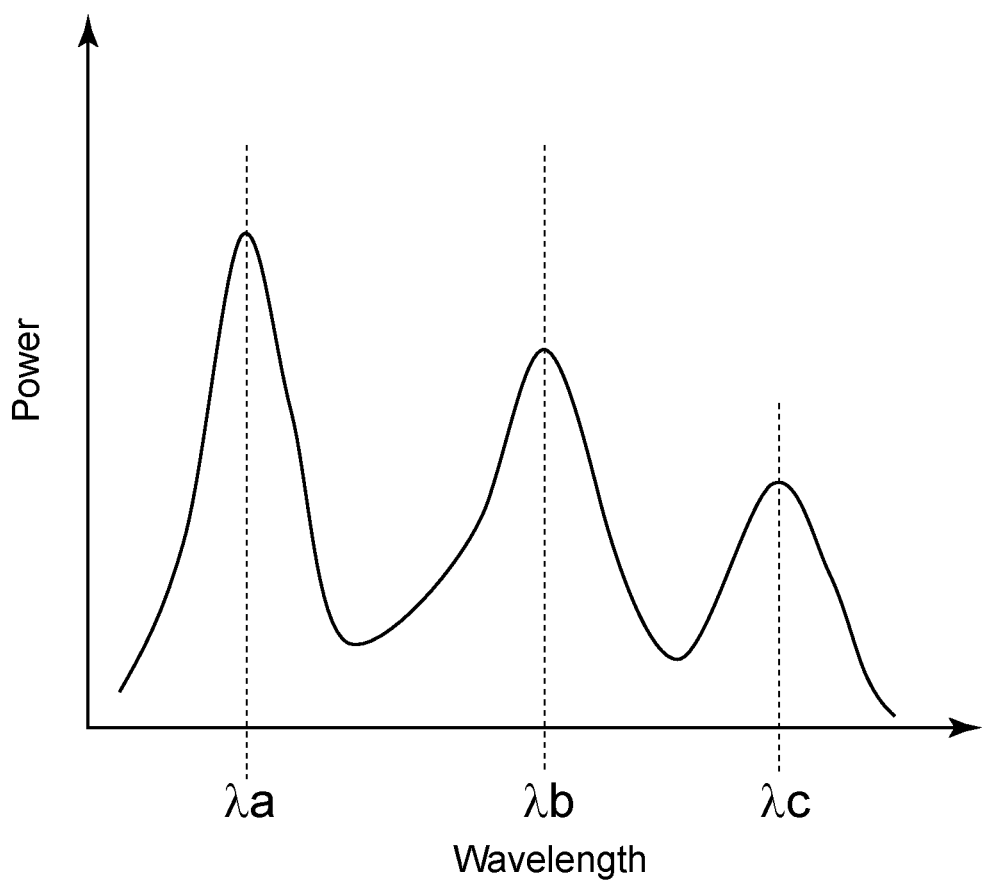
FIG. 3 is a schematic plot of a spectrum produced by a display.

FIG. 3 is a schematic plot of a spectrum produced by a display as viewed normal to the display when the display is fully on. The display may correspond to display 250 and includes an emissive component (e.g., an LCD display panel or an OLED display panel) having an emission spectra that includes visible light emission peak wavelengths $\lambda a$, $\lambda b$ and $\lambda c$ where $\lambda a < \lambda b < \lambda c$.

In some embodiments, the emissive component 260 has an emission spectrum including a longest visible light emission peak wavelength $\lambda c$, and the retarder 200 has a first retardance (in-plane retardance or out-of-plane retardance) of at least twice, or at least 5 times, or at least 10 times the longest visible light emission peak wavelength $\lambda c$. In some embodiments, the retarder 200 has an in-plane retardance and an out-of-plane retardance that are each at least twice, or at least 5 times, or at least 10 times the longest visible light emission peak wavelength $\lambda c$.

The following is a list of exemplary embodiments of the present description.

Embodiment 1 is a retarder comprising first and second outer layers and a birefringent layer disposed between and in direct contact with the first and second outer layers, wherein the birefringent layer comprises a first polyester having greater than 45 mole percent naphthalate units and greater than 45 mole percent ethylene units, wherein each of the first and second outer layers comprises a second polyester, the second polyester comprising 40 to 50 mole percent naphthalate units, at least 25 mole percent ethylene units, and 10 to 25 mole percent of branched or cyclic C4-C10 alkyl units, wherein the retarder has a first retardance in a range of 1 micrometer to 100 micrometers.

Embodiment 2 is the retarder of Embodiment 1, wherein the first retardance is an in-plane retardance.

Embodiment 3 is the retarder of Embodiment 1, wherein the first retardance is an out-of-plane retardance.

Embodiment 4 is the retarder of Embodiment 1, wherein the first retardance is an in-plane retardance and the retarder has an out-of-plane retardance in a range of 1 micrometer to 100 micrometers.

Embodiment 5 is the retarder of any one of Embodiments 1 to 4, wherein the first retardance is at least 2 micrometers, or at least 5 micrometers, or at least 8 micrometers.

Embodiment 6 is the retarder of any one of Embodiments 1 to 5, wherein the second polyester is substantially amorphous.

Embodiment 7 is the retarder of any one of Embodiments 1 to 6, wherein the second polyester has no melting point detectable by differential scanning calorimetry.

Embodiment 8 is the retarder of any one of Embodiments 1 to 6, wherein the second polyester has a melt transition temperature less than 220° C. after induced crystallization.

Embodiment 9 is the retarder of any one of Embodiments 1 to 6, wherein the second polyester has an enthalpy of fusion of less than 10 J/g, or less than 5 J/g, or less than 3 J/g.

Embodiment 10 is the retarder of any one of Embodiments 1 to 9, wherein the first and second outer layers each have an in-plane birefringence of less than 0.02 and an out-of-plane birefringence of less than 0.02.

Embodiment 11 is the retarder of any one of Embodiments 1 to 9, wherein the first and second outer layers each have an in-plane birefringence of less than 0.01 and an out-of-plane birefringence of less than 0.01.

Embodiment 12 is the retarder of any one of Embodiments 1 to 11, wherein the birefringent layer has an in-plane birefringence of at least 0.15, or at least 0.2.

Embodiment 13 is the retarder of any one of Embodiments 1 to 12, wherein the birefringent layer has an out-of-plane birefringence of at least 0.18, or at least 0.2.

Embodiment 14 is the retarder of any one of Embodiments 1 to 13, wherein the first polyester has a glass transition temperature of at least 100° C.

Embodiment 15 is the retarder of any one of Embodiments 1 to 13, wherein each of the first and second polyesters has a glass transition temperature of at least 90° C.

Embodiment 16 is the retarder of any one of Embodiments 1 to 13, wherein each of the first and second polyesters has a glass transition temperature of at least 100° C.

Embodiment 17 is the retarder of any one of Embodiments 1 to 16, wherein the second polyester comprises 25 to 50 mole percent ethylene units, or 25 to 40 mole percent ethylene units.

Embodiment 18 is the retarder of any one of Embodiments 1 to 17, wherein the first polyester is polyethylene naphthalate (PEN).

Embodiment 19 is the retarder of any one of Embodiments 1 to 18, wherein the mole percent naphthalate units, the mole percent ethylene units, and the mole percent of branched or cyclic C4-C10 alkyl units add to 100 mole percent for the second polyester, and the mole percent naphthalate units and the mole percent ethylene units add to 100 mole percent for the first polyester.

Embodiment 20 is the retarder of any one of Embodiments 1 to 19 having a haze less than 2 percent, or less than 1 percent.

Embodiment 21 is a retarder comprising first and second outer layers and a birefringent layer disposed between and in direct contact with the first and second outer layers, wherein the birefringent layer comprises a first polyester comprising a plurality of first monomer units and each of the first and second outer layers comprises a second polyester, the second polyester being a copolyester comprising a plurality of the first monomer units and a plurality of second monomer units, the second monomer units hindering crystallization of the second polyester, wherein the retarder has a first retardance in a range of 1 micrometer to 100 micrometers.

Embodiment 22 is the retarder of Embodiment 21, wherein the first and second outer layers each have an in-plane birefringence of less than 0.02 and an out-of-plane birefringence of less than 0.02.

Embodiment 23 is the retarder of Embodiment 21 or 22, wherein the first monomer units are naphthalate units.

Embodiment 24 is the retarder of any one of Embodiments 21 to 23, wherein at least one of the first and second polyesters further comprises a plurality of ethylene units.

Embodiment 25 is the retarder of any one of Embodiments 21 to 24, wherein the second monomer units are branched or cyclic C4-C10 alkyl units.

Embodiment 26 is the retarder of any one of Embodiments 21 to 25, wherein the first polyester comprises greater than 45 mole percent naphthalate units and greater than 45 mole percent ethylene units.

Embodiment 27 is the retarder of any one of Embodiments 21 to 26, wherein the second polyester comprises 40 to 50 mole percent naphthalate units, 25 to 50 mole percent ethylene units, and 10 to 25 mole percent of branched or cyclic C4-C10 alkyl units.

Embodiment 28 is a retarder comprising first and second outer layers and a birefringent layer disposed between and in direct contact with the first and second outer layers, each of the first and second outer layers having an in-plane birefringence less than 0.02 and an out-of-plane birefringence less than 0.02, wherein the birefringent layer comprises a first polyester comprising a plurality of first monomer units and each of the first and second outer layers comprises a second polyester, the second polyester being a copolyester comprising a plurality of the first monomer units, wherein the retarder has a first retardance in a range of 1 micrometer to 100 micrometers.

Embodiment 29 is the retarder of Embodiment 28, wherein the second polyester comprises a plurality of second monomer units hindering crystallization of the second polyester.

Embodiment 30 is the retarder of Embodiment 29, wherein the second monomer units comprise cyclic C4-C10 alkyl units.

Embodiment 31 is the retarder of any one of Embodiments 28 to 30, wherein the first monomer units are naphthalate units.

Embodiment 32 is the retarder of any one of Embodiments 28 to 30, wherein the first polyester comprises greater than 45 mole percent naphthalate units and greater than 45 mole percent ethylene units.

Embodiment 33 is the retarder of any one of Embodiments 28 to 32, wherein the second polyester comprises 40 to 50 mole percent naphthalate units, 25 to 50 mole percent ethylene units, and 10 to 25 mole percent of branched or cyclic C4-C10 alkyl units.

Embodiment 34 is the retarder of any one of Embodiments 21 to 33, further characterized according to any one of Embodiments 1 to 20.

Embodiment 35 is the retarder of any one of Embodiments 1 to 34 having a thickness in a range of 20 micrometers to 200 micrometers, or in a range of 25 micrometers to 125 micrometers.

Embodiment 36 is the retarder of any one of Embodiments 1 to 35, wherein a thickness of the birefringent layer is at least 80 percent or at least 90% of a thickness of the retarder.

Embodiment 37 is the retarder of any one of Embodiments 1 to 36, wherein at least one of the first and second polyesters comprises an ultraviolet absorber.

Embodiment 38 is a display comprising an emissive component and the retarder of any one of Embodiments 1 to 37 disposed to receive a light output of the emissive component.

Embodiment 39 is the display of Embodiment 38, wherein the emissive component has an emission spectrum comprising a longest visible light emission peak wavelength, the first retardance being at least twice, or at least 5 times, the longest visible light emission peak wavelength.

EXAMPLES

Examples 1 Through 3 and Comparative Examples C1 Through C3

Copolyester Manufacture and Characterization

A series of polyester copolymers was produced using the following procedure:

To a room temperature stainless steel 10-gallon reactor equipped with a hot oil temperature control system, an overhead separation column, and a vacuum pump, the following components were added (the relative amount, by weight, of each component for each Example is shown in Table 1):

Dimethyl-2,6-Naphthalene Dicarboxylate (NDC) (obtained from Indorama Ventures, Decatur, Ala.)

Ethylene Glycol (EG) (obtained from Huntsman Petrochemical, The Woodlands, Tex.)

Cyclohexanedimethanol (CHDM) (obtained from Eastman Chemical, Kingsport, Tenn.)

Tetrabutyl Titanate (TBT) (obtained from Dorf Ketal, Houston, Tex.)

Cobalt Acetate (CoAc) (obtained from Shepherd Chemical, Cincinnati, Ohio)

Zinc Acetate (ZnAc) (obtained from Mallinckrodt Baker, Phillipsburg, N.J.)

Antimony Triacetate (SbAc) (obtained from Arkema, Philadelphia, Pa.).

The % CHDM of the materials in the Resin Made row of Table 1 refer to the mole % of CHDM in the diols portion of the polyester. For example, PEN w/30% CHDM means that diol portion of the polyester contains 30 mole % CHDM. Based on the total diol and acid/esters, PEN w/30% CHDM contains 50 mole percent naphthalate units, 35 mole percent ethylene units, and 15 mole percent CHDM units.

These materials were heated and mixed at 125 rpm under 138 kPa (20 psig) of N2. The transesterification reaction was driven over the course of approximately 2 hours to a temperature of 257° C. (495° F.). Methanol was driven off through the separation column and collected in a receiver. The pressure in the kettle was slowly bled down to atmospheric. In the case of Comparative Examples C1 and C2 a stabilizer was added. The stabilizer was Triethylphosphonoacetate (TEPA) (obtained from Rhodia, Cranbury, N.J.).

For Examples, vacuum was applied to the kettle and increased as batch viscosity allowed. Excess ethylene glycol was driven off. After approximately 2 hours at a temperature of about 285° C. (545° F.) and a vacuum as low as about 1 mmHg, the reaction progressed to the desired endpoint (an intrinsic viscosity, IV, of about 0.48 dL/g). The kettle was drained and the resin was cooled to room temperature, and was later ground up into small pieces for further evaluation.

TABLE 1

| | Example | | | | | |
|---|---|---|---|---|---|---|
| | 1 | 2 | 3 | C1 | C2 | C3 |
| | Resin Made | | | | | |
| | PEN w/30% CHDM | PEN w/40% CHDM | PEN w/50% CHDM | PEN w/10% CHDM | PEN w/15% CHDM | PEN w/60% CHDM |
| Acids/Esters (#s) | | | | | | |
| NDC | 41.03 | 39.07 | 37.07 | 38.9 | 38.4 | 35.46 |
| Diols (#s) | | | | | | |
| EG | 20.86 | 18.87 | 16.96 | 20.8 | 20 | 15.32 |
| CHDM | 7.27 | 9.23 | 10.95 | 2.23 | 3.31 | 12.56 |
| Catalysts (g) | | | | | | |
| TBT | 1.86 | 1.77 | 1.68 | | | 1.61 |
| CoAc | | | | 2 | 2 | |
| ZnAc | | | 1.6 | 1.6 | | |
| SbAc | | | 8.9 | 8.9 | | |
| Stabilizer (g) | | | | | | |
| TEPA | | | | 3.6 | 3.6 | |

A specimen from each exemplary resin was then placed in a 150° C. oven for 48 hours for cold crystallization. The crystallized materials were tested using a Differential Scanning Calorimeter, DSC (obtained under the trade designation "MAQ2000" from TA Instruments, New Castle, Del.). The test included a 3-stage heating-cooling-heating temperature ramp at a temperature range of 30 to 290° C. The test specimen was held at 290° C. for 3 min after the first heat. The ramp rate was 20° C./min for both heating and cooling. Both the first heating scan and the second heating scan were analyzed. The measured melt point, the associated heat of enthalpy, and the glass transition temperature, Tg, of each material were recorded and are shown in Table 2.

TABLE 2

| | Example | | | | | |
|---|---|---|---|---|---|---|
| | 1 | 2 | 3 | C1 | C2 | C3 |
| | Resin | | | | | |
| | PEN w/30% CHDM | PEN w/40% CHDM | PEN w/50% CHDM | PEN w/10% CHDM | PEN w/15% CHDM | PEN w/60% CHDM |
| Melt Point (° C.) | 194 | not detected | 209 | 245 | 237 | 246 |
| ΔH (J/g) | 0.17 | 0 | 2.4 | 30 | 22 | 13.4 |
| Tg (° C.) | 118 | 117 | 116 | 119 | 118 | 117 |
| Resin Name | PENg30 | PENg40 | PENg50 | PENg10 | PENg15 | PENg60 |

Examples 1, 2 and 3, (PENg30, PENg40 and PENg50, respectively), exhibited melt points of 210° C. or lower with little to no heat of enthalpy (less than 3 J/g). The Tg of all specimens tested were measured between 115 and 120° C.

Examples 4 Through 11 and Comparative Examples C4 and C5

Film Manufacture and Characterization

A series of 3 layer films were produced via co-extrusion, co-orientation stretching, and annealing. The materials input details for the examples of the ABA film layer stack are provided in Table 3.

PEN refers to a 0.48 IV polyethylene naphthalate resin (synthesized in house by standard techniques well-known in the art.)

PETg refers to a 0.73 IV copolyester (obtained under the trade designation "GN071" from Eastman Corporation, Kingsport, Tenn.).

The series of PENg30, PENg40, PENg50 and PENg60 materials are described above in Examples 1, 2, 3 and Comparative Example C3, respectively.

TABLE 3

| | Core Layer | | Skin Layers | |
|---|---|---|---|---|
| Example # | Core Resin | PEN Feed Rate (kg/hr) | Skin Resin | Skins Feed Rate (kg/hr) |
| C4 | PEN | 9.1 | PEN | 4.5 |
| C5 | PEN | 9.1 | Ex. C3 PENg60 | 4.5 |
| 4 | PEN | 9.1 | PETG | 4.5 |
| 5 | PEN | 9.1 | Ex. 1 PENg30 | 4.5 |
| 6 | PEN | 9.1 | Ex. 2 PENg40 | 4.5 |
| 7 | PEN | 9.1 | Ex. 3 PENg50 | 4.5 |
| 8 | PEN | 10.2 | Ex. 1 PENg30 | 3.4 |
| 9 | PEN | 11.3 | Ex. 1 PENg30 | 2.3 |
| 10 | PEN | 10.2 | Ex. 2 PENg40 | 3.4 |
| 11 | PEN | 11.3 | Ex. 2 PENg40 | 2.3 |

The outer, skin, or "A" layers were produced by extruding the above-identified resins, using a 27 mm Twin Screw Extruder, through a neck tube and gear pump feeding into the outer layers of a 3-layer feed block. This melt train used a progressive temperature profile, with peak temperature of 282° C. The central, core or "B" layer was produced by extruding PEN resin, using a 27 mm TSE with a progressive temperature profile peaking at or around 282° C., through a neck tube and gear pump into the middle layer of the 3-layer feed block. The feed block and 20 cm (8 inch) die were maintained at a target temp of 282° C. while the casting wheel was run at about 50° C. Cast web films of 0.30 mm (12 mil) thickness were produced during this process.

The cast webs produced from the extrusion and casting process were then stretched and annealed using a laboratory film stretcher (obtained under the trade designation "KARO IV" from Brueckner Maschinenbau GmbH & Co., Siegsdorf, Germany. Stretching of the film occurred in an oven set to 140° C. The preheat times in the oven was 45 seconds. Films were stretched biaxially to a final dimension 100% (of original size) in the machine direction (MD) by 500% (of original size) in the transverse direction (TD), resulting in a 0.061 mm (2.4 mil) finished film. Each film was then conveyed into an annealing oven set to 225° C., and held there for 15 seconds. These stretched, annealed films were then evaluated for refractive indices, film handling characteristics, haze, and retardance.

The refractive indices of the film specimens were measured using a prism coupler (obtained from Metricon Corporation, Pennington, N.J.) in the machine direction (MD), transverse direction (TD) and thickness (TM) directions. The refractive indices of MD, TD and TM are labeled Nx, Ny and Nz respectively. In-plane birefringence represents the difference between the Ny and Nx measurements for a given sample. Out-of-plane Birefringence represents the difference between the average in-plane index, that is, the average of Nx and Ny, and the index normal to the film (Nz).

Film handling represents a qualitative characterization based on the propensity of a film to split or crack during preparation, during and/or after stretching. It should be noted that uniaxially oriented (one-direction stretched) polyesters such as PEN or PET are prone to fracture during web handling.

Haze was tested using a haze meter (obtained under the trade designation "HAZE-GARD" from BYK-Gardner USA, Columbia, Md.). Haze was measured according to ASTM D-1003, and is reported as "% Haze".

Retardance was calculated based on the thickness of the skin layers multiplied by the measured birefringence of the skin layers plus the thickness of the core PEN layer multiplied by the measured birefringence of sample C4, which is effectively a monolithic PEN film.

The results of these tests are reported in Table 4.

tion as evidenced by a significant improvement in edge quality and avoidance of fracture during web handling.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A retarder comprising first and second outer layers and a birefringent layer disposed between and in direct contact with the first and second outer layers, wherein the birefringent layer comprises a first polyester having greater than 45 mole percent naphthalate units and greater than 45 mole percent ethylene units, wherein each of the first and second outer layers comprises a second polyester, the second polyester comprising 40 to 50 mole percent naphthalate units, at least 25 mole percent ethylene units, and 10 to 25 mole percent of branched or cyclic C4-C10 alkyl units, wherein the birefringent layer of the retarder has a first retardance in a range of 1 micrometer to 100 micrometers.

2. The retarder of claim 1, wherein the first retardance is an in-plane retardance and the retarder has an out-of-plane retardance in a range of 1 micrometer to 100 micrometers.

3. The retarder of claim 1, wherein the second polyester has no melting point detectable by differential scanning calorimetry.

4. The retarder of claim 1, wherein the second polyester has an enthalpy of fusion of less than 10 J/g.

5. The retarder of claim 1, wherein the first and second outer layers each have an in-plane birefringence of less than 0.02 and an out-of-plane birefringence of less than 0.02.

6. The retarder of claim 1, wherein the birefringent layer has an in-plane birefringence of at least 0.15.

TABLE 4

| Example # | Skin Layer MD index (Nx) | Skin Layer TD index (Ny) | Skin Layer TM index (Nz) | In Plane Birefringence | Out-of-plane birefringence | Film web handling | % Haze | Calculated in-plane retardance (nm) | Calculated out of plane retardance (nm) |
|---|---|---|---|---|---|---|---|---|---|
| C4 | 1.626 | 1.849 | 1.51 | 0.223 | 0.228 | splitty | 0.40 | 13594 | 13899 |
| C5 | 1.601 | 1.711 | 1.58 | 0.110 | 0.076 | slightly splitty | 0.38 | 11298 | 10810 |
| 4 | 1.566 | 1.566 | 1.563 | 0.000 | 0.003 | good | 0.26 | 9063 | 9327 |
| 5 | 1.629 | 1.631 | 1.624 | 0.002 | 0.006 | good | 0.35 | 9103 | 9388 |
| 6 | 1.622 | 1.626 | 1.621 | 0.004 | 0.003 | good | 0.80 | 9144 | 9327 |
| 7 | 1.622 | 1.629 | 1.618 | 0.007 | 0.008 | good | 0.28 | 9205 | 9428 |
| 8 | 1.629 | 1.63 | 1.625 | 0.001 | 0.004 | good | 0.40 | 10302 | 10546 |
| 9 | 1.625 | 1.629 | 1.623 | 0.004 | 0.004 | slightly splitty | 0.69 | 11369 | 11623 |
| 10 | 1.625 | 1.626 | 1.62 | 0.001 | 0.005 | good | 0.50 | 10211 | 10500 |
| 11 | 1.627 | 1.627 | 1.618 | 0.000 | 0.009 | slightly splitty | 0.50 | 11328 | 11674 |

All specimens exhibited greater than 9000 nm in-plane retardance for these 0.061 mm (2.4 mil) films. The PEN core provided a high retardance layer, achieving in-plane and out-of-plane birefringence of greater than 0.20. The films yielded a low haze value, less than 1%, after annealing. Films with isotropic skin layers (birefringence less than 0.01) provided superior handling during and after orienta- 7. The retarder of claim 1, wherein the first polyester is polyethylene naphthalate (PEN).

8. A retarder comprising first and second outer layers and a birefringent layer disposed between and in direct contact with the first and second outer layers, wherein the birefringent layer comprises a first polyester comprising a plurality of first monomer units and each of the first and second outer layers comprises a second polyester, the second polyester being a copolyester comprising a plurality of the first monomer units and a plurality of second monomer units, the second monomer units hindering crystallization of the second polyester, wherein the birefringent layer of the retarder has a first retardance in a range of 1 micrometer to 100 micrometers.

9. The retarder of claim 8, wherein the first and second outer layers each have an in-plane birefringence of less than 0.02 and an out-of-plane birefringence of less than 0.02.

10. The retarder of claim 8, wherein the second monomer units are branched or cyclic C4-C10 alkyl units.

11. The retarder of claim 8, wherein the second polyester comprises 40 to 50 mole percent naphthalate units, 25 to 50 mole percent ethylene units, and 10 to 25 mole percent of branched or cyclic C4-C10 alkyl units.

12. A retarder comprising first and second outer layers and a birefringent layer disposed between and in direct contact with the first and second outer layers, each of the first and second outer layers having an in-plane birefringence less than 0.02 and an out-of-plane birefringence less than 0.02, wherein the birefringent layer comprises a first polyester comprising a plurality of first monomer units and each of the first and second outer layers comprises a second polyester, the second polyester being a copolyester comprising a plurality of the first monomer units, wherein the birefringent layer of the retarder has a first retardance in a range of 1 micrometer to 100 micrometers.

13. The retarder of claim 12, wherein the second polyester comprises a plurality of second monomer units hindering crystallization of the second polyester.

14. A display comprising an emissive component and the retarder of any claim 1 disposed to receive a light output of the emissive component.

15. The display of claim 14, wherein the emissive component has an emission spectrum comprising a longest visible light emission peak wavelength, the first retardance being at least twice the longest visible light emission peak wavelength.

* * * * *